US011651272B2

(12) United States Patent
Srivastava et al.

(10) Patent No.: US 11,651,272 B2
(45) Date of Patent: May 16, 2023

(54) MACHINE-LEARNING-FACILITATED CONVERSION OF DATABASE SYSTEMS

(71) Applicant: SAP SE, Walldorf (DE)

(72) Inventors: Garima Srivastava, Bangalore (IN); Yeshwant More, Bangalore (IN)

(73) Assignee: SAP SE, Walldorf (DE)

( * ) Notice: Subject to any disclaimer, the term of this patent is extended or adjusted under 35 U.S.C. 154(b) by 1100 days.

(21) Appl. No.: 16/028,747

(22) Filed: Jul. 6, 2018

(65) Prior Publication Data
US 2020/0012970 A1 Jan. 9, 2020

(51) Int. Cl.
*G06N 20/00* (2019.01)
*G06F 16/23* (2019.01)

(52) U.S. Cl.
CPC .............. *G06N 20/00* (2019.01); *G06F 16/23* (2019.01)

(58) Field of Classification Search
None
See application file for complete search history.

(56) References Cited

U.S. PATENT DOCUMENTS

| | | | | |
|---|---|---|---|---|
| 6,256,773 | B1 * | 7/2001 | Bowman-Amuah | G06F 8/71 707/999.202 |
| 9,336,025 | B2 * | 5/2016 | Kirk | G06F 9/455 |
| 9,886,262 | B2 * | 2/2018 | Thomas | G06F 8/61 |
| 10,409,995 | B1 * | 9/2019 | Wasiq | H04L 9/08 |
| 2008/0313595 | A1 * | 12/2008 | Boulineau | G06Q 30/0201 717/101 |
| 2014/0222497 | A1 * | 8/2014 | Cantor | G06Q 10/06 705/7.28 |
| 2014/0282400 | A1 * | 9/2014 | Moorthi | G06F 8/71 717/122 |
| 2015/0020066 | A1 * | 1/2015 | Kirk | G06F 21/56 718/1 |
| 2015/0379423 | A1 * | 12/2015 | Dirac | G06N 20/00 706/12 |
| 2016/0274994 | A1 * | 9/2016 | Nikam | G06F 11/3608 |
| 2016/0292065 | A1 * | 10/2016 | Thangamani | H04L 41/064 |

(Continued)

OTHER PUBLICATIONS

Probabilistic Estimation of Software Project Duration, A.M. Connor, New Zealand Journal of Applied Computing & Information Technology, 11(1), 11-22.*

(Continued)

*Primary Examiner* — David J Stoltenberg
(74) *Attorney, Agent, or Firm* — Klarquist Sparkman, LLP

(57) ABSTRACT

An improved system and process for machine-learning upgrade analysis and training thereof is provided herein. A request to analyze the time to upgrade a current system to a target system may be received. A change list having one or more changes for the target system may be read. Custom code for the current system may be compared to the change list to identify recommended changes to the custom code to upgrade the custom code to be compatible with the target system. The recommended changes may be classified into one or categories respectively via a trained first machine-learning algorithm. Time to upgrade the custom code for the respective classified changes may be estimated via a trained second machine-learning algorithm. The recommended changes, the classifications of the recommended changes, and the time estimates of the recommended changes may be provided.

20 Claims, 13 Drawing Sheets

(56) References Cited

U.S. PATENT DOCUMENTS

| | | | | |
|---|---|---|---|---|
| 2017/0235569 | A1* | 8/2017 | Sturtevant | G06Q 40/12 |
| | | | | 717/102 |
| 2018/0088939 | A1* | 3/2018 | Strachan | G06N 20/00 |
| 2018/0275989 | A1* | 9/2018 | Kakkad | G06F 11/3409 |
| 2018/0314519 | A1* | 11/2018 | Lee | G06F 11/3604 |
| 2019/0026634 | A1* | 1/2019 | Homeyer | G06N 5/04 |
| 2019/0026663 | A1* | 1/2019 | Homeyer | G06Q 10/06316 |
| 2019/0108001 | A1* | 4/2019 | Hauser | G06F 11/362 |
| 2019/0108223 | A1* | 4/2019 | Fabijancic | G06F 8/30 |
| 2019/0196952 | A1* | 6/2019 | Manchiraju | G06N 3/0445 |
| 2019/0324731 | A1* | 10/2019 | Zhou | G06N 5/003 |
| 2019/0332369 | A1* | 10/2019 | Gupta | G06F 8/65 |
| 2020/0012970 | A1* | 1/2020 | Srivastava | G06N 20/00 |

OTHER PUBLICATIONS

An approach to software development effort estimation using machine learning, Vlad-Sebastian Ionescu, 978-1-5386-3368-7/17 2017 IEEE.*

Machine Learning Approaches to Estimating Software Development Effort, Srinivasan et al., IEEE Transactions on Software Engineering, vol. 21, No. 2, Feb. 1995.*

"In-Memory Data Platform," SAP HANA retrieved from: https://www.sap.com/india/products/hana.html, visited Jul. 5, 2018, 11 pages.

"SAP HANA," Wikipedia, visited Jul. 5, 2018, 5 pages.

"Next-Generation ERP Software," SAP S/4HANA, retrieved from: https://www.sap.com/india/products/s4hana-erp.html, visited Jul. 5, 2018, 14 pages.

"What is SAP S/4HANA? 13 Questions Answered," SAP, retrieved from: https://news.sap.com/2015/03/what-is-sap-s4hana-13-questions-answered/, visited Jul. 5, 2018, 10 pages.

"#S4HANA Cloud use case series—The Collection," SAP, retrieved from: https://blogs.sap.com/2017/03/04/s4hana-cloud-use-case-series-the-collection/, Mar. 4, 2017, 4 pages.

"From SAP ERP 6.0 to SAP S/4HANA in Four Steps," SAP, retrieved from: https://news.sap.com/2016/08/from-sap-erp-6-0-to-sap-s4hana-in-four-steps/, Aug. 15, 2016, 10 pages.

"SAP S/4HANA System Conversion—Custom code adaptation process," retrieved from: https://blogs.sap.com/2017/02/15/sap-s4hana-system-conversion-custom-code-adaptation-process/, Feb. 15, 2017, 36 pages.

* cited by examiner

MACHINE-LEARNING-FACILITATED CONVERSION OF DATABASE SYSTEMS

FIELD

The present disclosure generally relates to custom database systems, and applications or systems that facilitate database or system transition or migration. Particular implementations relate to using machine learning techniques to provide effort estimates for system transition and provide suggestions for reducing or improving transition effort.

BACKGROUND

Computing and database systems may provide effective service over long periods of time, eventually becoming legacy systems. While such legacy systems may remain effective, there may be reasons to upgrade to a current system, such as for new features or improved efficiency. The decision to upgrade may rest on understanding the details on transitioning or migrating to a new system. However, such information is often not readily available. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system and a process for training and transition analysis is provided herein. Training data for classifying training changes to a training system may be received. Training data for estimating times to implement the training changes to the training system may be received at 704. Classification values for the training changes to the training system may be set. Estimate values for the training changes to the training system may be set. A first machine-learning algorithm may be executed using the training data to classify the training changes. The first machine-learning algorithm may be trained using the classification results of the execution of the first machine-learning algorithm and the set classification values for the training changes. A second machine-learning algorithm may be executed using the training data to estimate times to implement the training changes. The second machine-learning algorithm may be trained using the estimate results of the execution of the second machine-learning algorithm and the set estimate values of the training changes.

A request to analyze a transition from a current system to a target system may be received. The request may include an identifier of software for the current system, a location for the current system, and an identifier of software for the target system. A change list for the target system may be obtained based on the identifier for the target system. The change list may include one or more changes between the current system and the target system. Custom code may be accessed at the current system based on the location of the current system. One or more changes needed in the custom code to transition the current system to the target system based on the change list may be determined. Locations in the custom code for the one or more changes may be identified. The one or more changes may be classified via the first machine-learning algorithm. Time to implement the one or more changes may be estimated via the second machine-learning algorithm and the classifications of the one or more changes.

A total time estimate to implement the one or more changes may be generated. A transition analysis report may be generated. The transition analysis report may include the one or more changes, the locations of the one or more changes, the classifications of the one or more changes, the time estimates of the one or more changes, and the total time estimate.

A system and a process for system upgrade analysis is provided herein. A request to analyze a transition from a current system to a target system may be received. The request may include a namespace for the current system. A change list for the target system may be obtained. The change list may include one or more changes between the current system and the target system. Custom code may be accessed at the current system based on the namespace. One or more changes to the custom code to upgrade the current system to the target system based on the change list may be determined. The determining may include scanning the custom code for function calls or variables listed in the change list. Locations in the custom code for the one or more changes may be identified. The one or more changes may be classified via a first machine-learning algorithm. Time to implement the one or more changes may be estimated via a second machine-learning algorithm and the classifications of the one or more changes. A transition analysis report may be generated. The transition analysis report may include the one or more changes, the locations of the one or more changes, the classifications of the one or more changes, and the time estimates of the one or more changes.

A system and a process for machine-learning upgrade analysis is provided herein. A request to analyze the time to upgrade a current system to a target system may be received. The request may include one or more locations for the current system. A change list for the target system may be read. The change list may have one or more changes in the target system compared to previous versions of the target system. Custom code for the current system may be compared to the change list to identify recommended changes to the custom code to upgrade the custom code to be compatible with the target system. The recommended changes may be classified into one or more categories respectively via a trained first machine-learning algorithm. Time to upgrade the custom code for the respective classified changes may be estimated via a trained second machine-learning algorithm. The recommended changes, the classifications of the recommended changes, and the time estimates of the recommended changes may be provided.

The present disclosure also includes computing systems and tangible, non-transitory computer readable storage media configured to carry out, or including instructions for carrying out, an above-described method. As described herein, a variety of other features and advantages can be incorporated into the technologies as desired.

The foregoing and other objects, features, and advantages of the invention will become more apparent from the following detailed description, which proceeds with reference to the accompanying figures.

DETAILED DESCRIPTION

Figure 1:
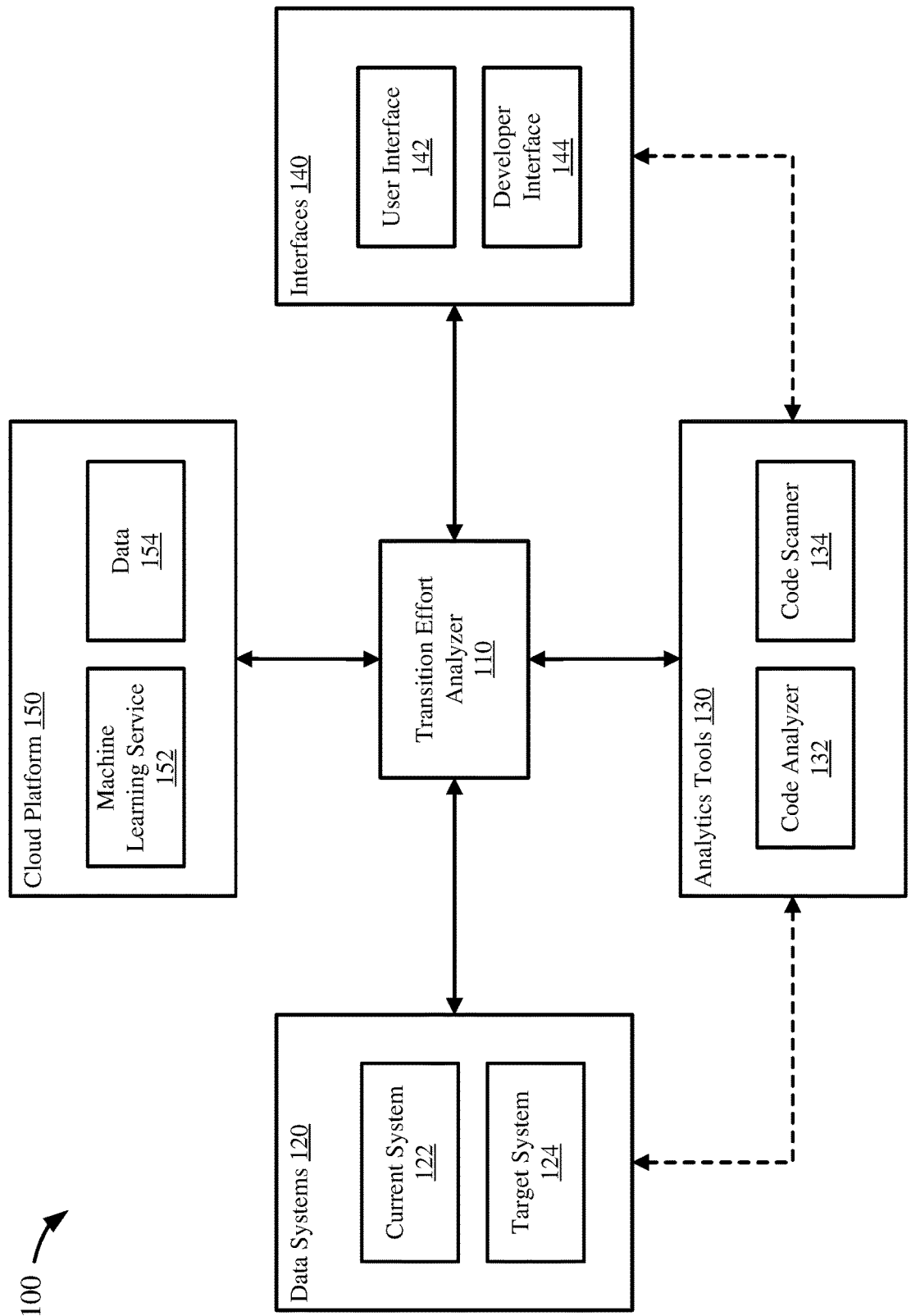
FIG. 1 is a schematic diagram depicting an architecture for a transition effort analyzation framework.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Transition Effort Analyzer Overview

A machine-learning-based framework for generating system transition efforts and recommendations is provided herein. This transition effort analyzation framework (or transition effort analyzer) may analyze a current computing system, such as a database system, compared to a target system (e.g., a newer version of software operating the database system or a system running on different software, such as software provided by a different vendor), and recommend changes needed to make the transition and provide estimates of the effort (e.g., time or person-days) to complete the transition. Such a transition may include converting a current system to a newer version of system, such as from version 1 to version 2, or may include transitioning to a different type of system, such as to a different computing system product.

Such transition can be complex and time-consuming Enterprise systems are often used for extensive periods of time and grow increasingly large during this time, with additions, patches or other fixes, customizations, and increased scope. There are often many different parts or subsystems which can lead to many different pathways to transitioning. Further, separate clients often have very different systems in practice running in very different circumstances, even when they are using the same software package. Such differences make it difficult to analyze the system for transitioning to a new system, and for identifying or quantifying the specific requirements for executing a successful transition. The present invention allows a machine-learning classifier to be readily constructed where the estimates of a variety of users can be used to estimate many different source configurations and transition options. In addition, use of common categorization lists, transition tools (e.g., table format adjuster) can increase the efficiency of the transition analysis and improve the useability of the results from the analysis. For example, the transition analysis from such a machine-learning system may provide specific implementation changes needed for the transition or upgrade, and so may be used to develop a specific transition plan or testing plan.

The analysis may include determining changes to custom code or reprogramming, data migration, interface updates, or hardware changes. The analysis may also include changes to stored data, such as data stored in a database, that may be required to migrate the data to the target system. The transition effort analyzation framework may also provide recommendations on what changes to make. For example, the framework may recommend which segments of custom code to change, and identify changes that provide corresponding functionality and are compatible with the target database system. Such recommendations may improve the transition and final (target) system by providing more accurate or more efficient changes to the custom code that is transitioned to the target system. For example, suggestions may be provided for adjusting the current database system such that fewer computing resources (e.g., processor, network, or memory use) are required for a transition, reduce transition time, and reduce manual effort required for a transition. Providing such suggestions can also make a transition more efficient by affirmatively documenting changes that will be needed, which can reduce manual analysis and planning needed for a transition. Such recommendations may also increase the updating or programming efficiency, and thus may reduce the number or scope of bugs, improving system quality overall, and may improve or simplify testing. Such recommendations may also be used to generate a transition plan for effectively or efficiently implementing the transition.

For example, a customer of an SAP ERP™ system from SAP, SE, of Walldorf, Germany, may be interested in upgrading from their custom ERP system to S/4HANA™ from SAP. However, the customer may want to know what the effort (e.g., total time or total person-days) will be to upgrade, and may want recommendations for upgrading their ERP system to S/4HANA, such as which code segments to target, which specific changes to make, or which database fields or tables require translation during migration. Such information can improve the decision as to making the transition, how to execute the transition, and the final system itself based on the recommended code changes and targets.

Example 2—Transition Effort Analyzer Architecture

FIG. 1 is a schematic diagram depicting an architecture 100 for a transition effort analyzer 110, which can provide an analyzation framework. The transition effort analyzer 110 may access or utilize multiple resources, such as data systems 120, analytics tools 130, interfaces 140, or a cloud platform 150. Such resources 120, 130, 140, 150 may be accessed across a network, or may be fully or partially integrated with the transition effort analyzer 110.

The transition effort analyzer 110 may access one or more data systems 120. The data systems 120 may include or provide information about the transition. For example, the data systems 120 may include the current system 122, which may be analyzed for transitioning to a new system version or new software system. The current system 122 may include standard software, custom software, a database having stored data or custom data structures, or custom code. The data sources may include a target system 124, which may include information about a software product or version to which the current system may be transitioned. This may include the actual software of the target system, or may include information about the target system, such as a change database having release notes or other change information from previous versions. The data systems 120 may include sources of other information relevant to the transition analysis, as described herein.

The transition effort analyzer 110 may access one or more analytics tools 130. The analytics tools 130 may perform some portion of, or assist in, the transition analysis. In some embodiments, the analytics tools 130 may be integrated with the transition effort analyzer 110. In other embodiments, the analytics tools 130 may be separate programs or services accessible by the transition effort analyzer 110.

The analytics tools 130 may include, for example, a code scanner 134. A code scanner 134 may receive code, such as the custom code, or a location for the custom code, and may provide information about the code as a result of scanning. For example, a code scanner 134 may identify particular functions or variables used in the code. Additionally or alternatively, the code scanner 134 may prepare code for analysis by the transition effort analyzer 110, such as by formatting the code or inserting metadata about the code.

The analytics tools 130 may also include a code analyzer 132. The code analyzer 132 may function similarly to the code scanner 134, and may provide additional analytics results from the input code. For example, a code analyzer may provide a list of locations identifying particular functions or variables, or may provide confirmation of the use of certain functionality or external calls within the analyzed code. The code analyzer 132 and the code scanner 134 may be integrated together, or may communicate or otherwise work together. Alternatively, the transition effort analyzer 110 may coordinate between the code analyzer 132 and code scanner 134. The analytics tools 130 may also access directly the data systems 120, or may make use of the data sources as made available through the transition effort analyzer 110. The analytics tools 130 may include additional programs or accessible functionality relevant to the transition analysis, as described herein.

The transition effort analyzer 110 may access one or more interfaces 140. The interfaces 140 may be integrated with the transition effort analyzer 110, or they may be a separate program or service that provides interface functionality for accessing or using the transition effort analyzer. One or more of the interfaces may be a launchpad program, or may be part of a data source 120, such as the current system 122 (and thereby make the transition effort analyzer 110 available to users through the current system).

An interface may be a user interface 142, or may be a developer or other technical user interface 144. For example, a developer interface 144 may provide functionality for training machine-learning algorithms in the transition effort analyzer 110. The interfaces 140 may also access directly the analytics tools 130, or may make use of the analytics tools as made available through the transition effort analyzer 110. The interfaces 140 may include additional programs or accessibility functionality relevant to the transition analysis, as described herein. For example, the interfaces 140 may be used to access a transition analysis report or training report as described herein. Further, a user interface 142 may include a transition wizard. The transition wizard may include functionality for reviewing, selecting, or tracking changes recommended in a transition analysis report. Further, such a transition wizard may be designed for use by a non-technical user. A transition wizard may also assist in generating a transition plan or a testing plan based on a transition analysis report. A transition wizard may also have access to data systems 120 or analytics tools 130, and may include functionality to execute functionality available by the data systems or analytics with respect to the transition analysis report.

The transition effort analyzer 110 may access a cloud platform 150, or may be made available, hosted on, or otherwise integrated with the cloud platform. The cloud platform 150 may be used to network the transition effort analyzer 110 with the various resources 120, 130, 140. The cloud platform 150 may provide certain services or data for the transition effort analyzer 110. For example, the cloud platform 150 may provide machine-learning services 152, such as by hosting the trained or in-training machine-learning algorithms used by the transition effort analyzer 110. Such hosted machine-learning services 152 may be called across a network or within the hosting system by the transition effort analyzer 110. As another example, analysis data 154 may be stored on the cloud platform 150 for the transition effort analyzer 110. This may include training data for the machine-learning algorithms in the transition effort analyzer 110 or hosted in the machine-learning services 152, or other analysis data generated by the transition effort analyzer, such as reports, or previous or partial analysis data. The cloud platform 150 can also host one or both of the data systems 120.

Other tools may be available as well, such as tools for executing transition steps (as identified in the transition analysis described herein) or formatting code or stored data for transition. Such tools may be integrated with the transition effort analyzer 110, the data systems 120, or the analytics tools 130, and may be accessible therefrom, or from the interfaces 140. Such tools may also be hosted in the cloud platform 150. For example, a tool may available for programmatically or automatically updating a database schema, such as to match a recommended database schema change which may be available in a transition analysis report. Such program tools may be available to implement custom code changes, or instantiate or configure a transition environment, or pre-format data, code, or files for the transition. Such tools may be activated through the transition wizard, in addition to being run by a user or through another program.

Example 3—Transition Analysis Factors

Figure 2:
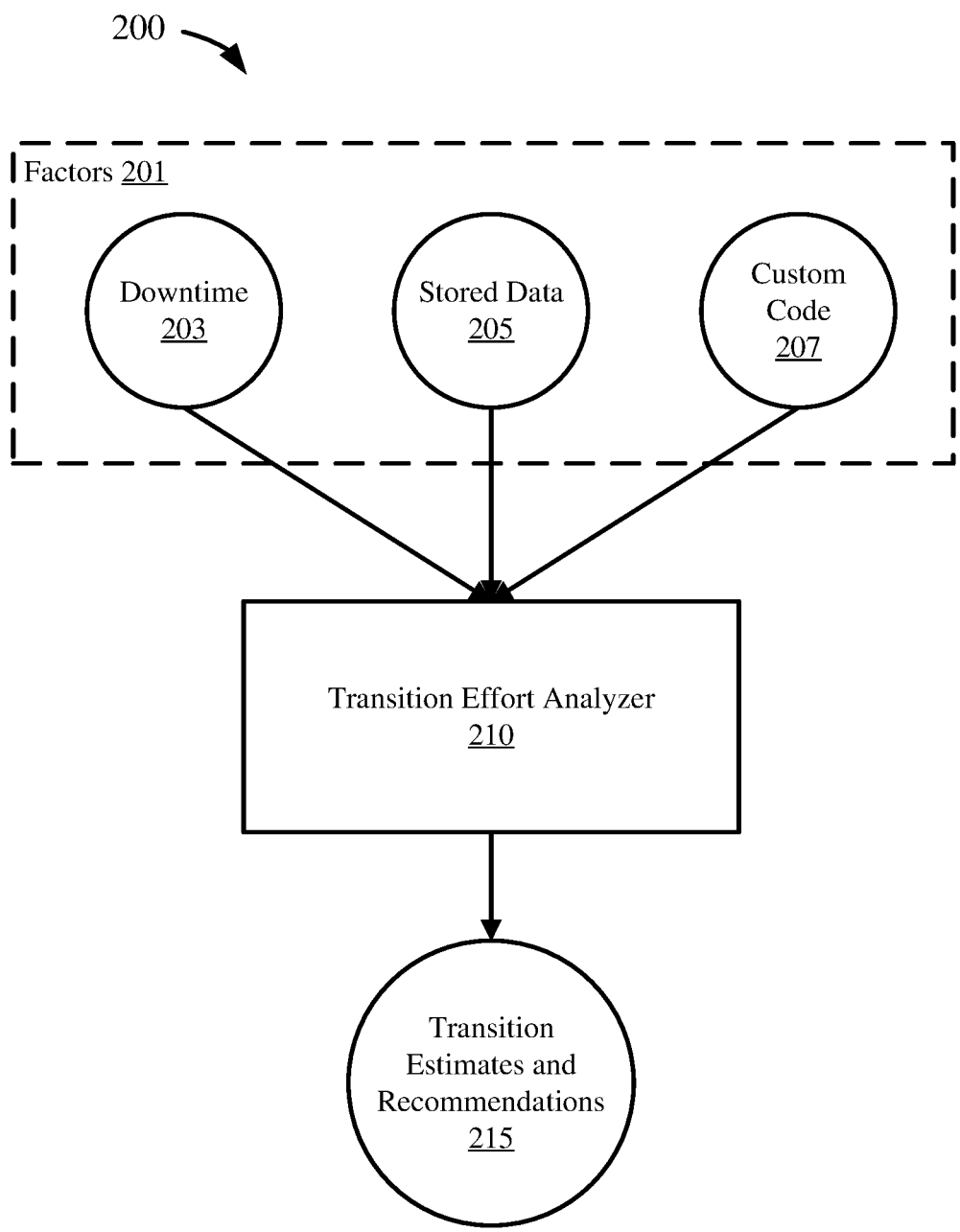
FIG. 2 is a diagram illustrating factors in transition analysis.

FIG. 2 is a diagram 200 illustrating factors in transition analysis. A transition effort analyzer 210 may analyze one or more factors 201 as part of generating transition effort estimates and recommendations 215. The factors 201 may include the duration of downtime 203, stored data 205, or custom code 207. Other factors may be included in the analysis by the transition effort analyzer 210.

The downtime 203 may include an estimated duration of downtime based on the total time estimated to complete the transition. Such an estimated downtime 203 may be used in generating recommendations 215 for making the transition. For example, based on estimated downtime 203, the transition effort analyzer 210 may recommend a particular set or subset of changes 215 to make to effect the transition, or may recommend an order, such as of priority, of changes. The downtime 203 may additionally or alternatively include an input target downtime, or maximum allowed downtime. Such a downtime parameter 203 may be used by the transition effort analyzer 210 to calculate the time estimates 215 for individual changes (e.g., such as each change being a percentage of the total time allotted), or may be used to recommend a particular transition plan that makes greater use of more vigilant measures (e.g. more targeted testing, earlier testing of specific functionality or upgrades, more focused assignment of change implementations, and so on) in performing the transition.

The stored data 205 may include data stored in the current system that may be transferred to the target system. Such stored data 205 may be data in a database that is to be migrated. The transition effort analyzer 210 may analyze the total amount of stored data 205 that may be migrated to generate a time or effort estimate to migrate the data 215, or recommendations for the migration of the stored data, such as an order in which database tables or files should be processed or transitioned. The transition effort analyzer 210 may analyze the stored data itself 205 to identify changes needed to the data, such as format changes or data mappings from the current data structures to the target data structures, or other data transformation or reprocessing, and estimate the total effort or time needed to perform those changes, or make recommendations on what changes are needed, the data mappings, or the data migration plan (such as order of priority of changes).

The custom code 207 may be additions or custom support programs for the current system that may need to be updated for the target system. The transition effort analyzer 210 may analyze the total amount of custom code 207 that may need to be transitioned to generate a time or effort estimate 215 to update the custom code, or recommendations for the update of the custom code, such as order of changes to be implemented. The transition effort analyzer 210 may analyze the custom code itself 207 to identify changes needed to the custom code to adapt it to the target system, and estimate the total effort or time needed to implement those changes, or make recommendations as to how to implement the needed changes or on the priority of the changes.

Example 4—Transition Analyzer Factor Sources

Figure 3:
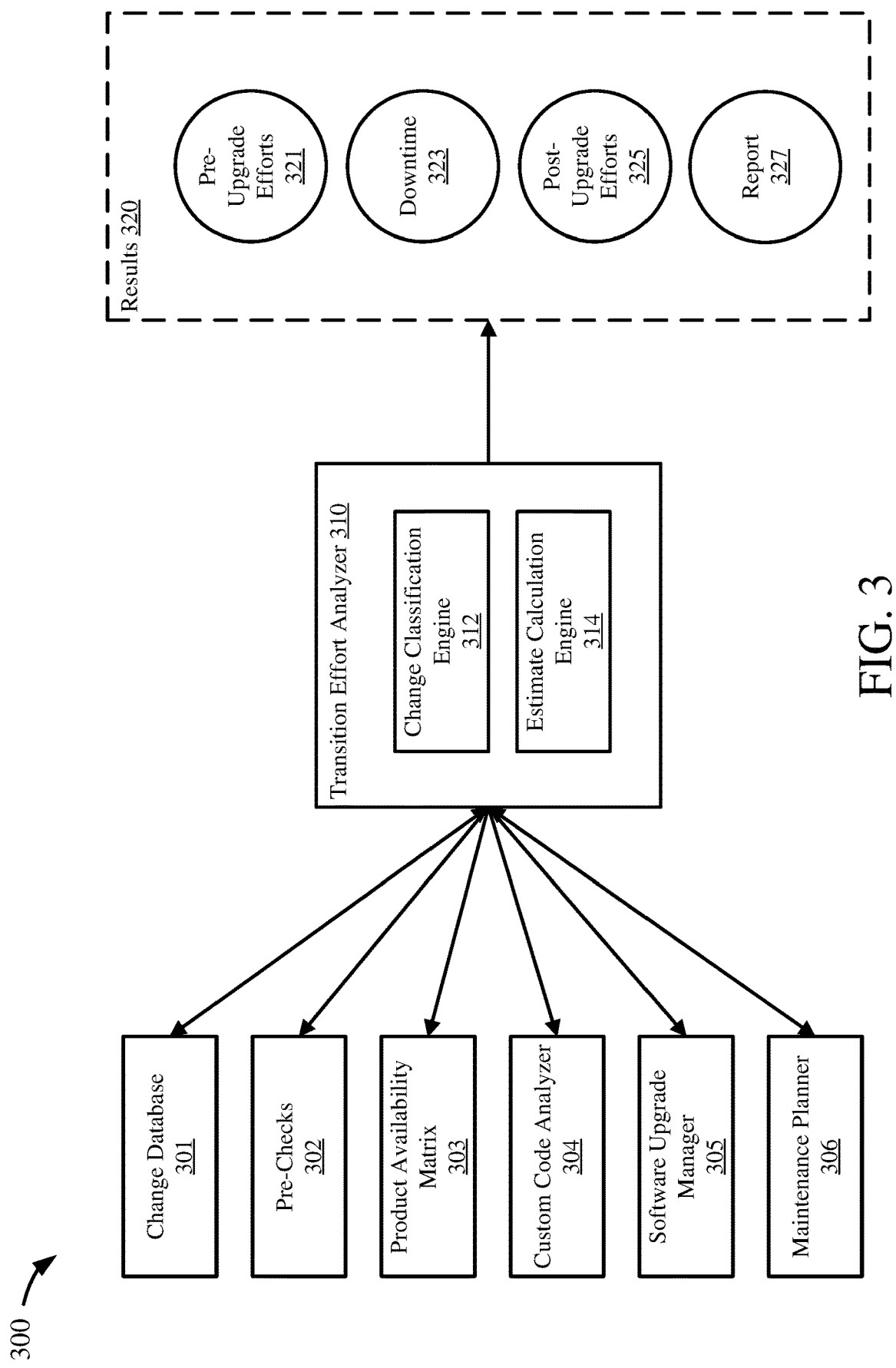
FIG. 3 is a schematic diagram depicting factor data sources for a transition effort analyzer.

FIG. 3 is a schematic diagram 300 depicting factor data sources (e.g., sources of information for the factors 203, 205, 207 of FIG. 2) for a transition effort analyzer 310. The transition effort analyzer 310 may obtain data for one or more factors from one or more sources; such sources may be categorized as data systems 120, analytics tools 130, or interfaces 140 as shown in FIG. 1.

The transition effort analyzer 310 may access a change database 301. The change database 301 may be a database or a basic file. Generally, the change database 301 may provide a listing of changes in a given software product or version from previous products or versions, such as release notes or a simplification list. For example, the change database 301 may identify, for a given application or version, features that have been changed, or may identify explicit code that has been changed, such as data fields, interface arguments, or data structures. The transition effort analyzer 310 may obtain such a change list from the change database 301.

The transition effort analyzer 310 may access one or more pre-checks 302 that have been carried out against the current system or against the target system of the transition. Pre-checks 302 may be stored as a file or in a database, and may be the results or partial results of analysis already performed. For example, the compatibility of custom code in the current system may already have been analyzed against one or more target systems, and the results available in the pre-checks 302. Such results may be accessed by the transition effort analyzer 310 for use in transition analysis.

The transition effort analyzer 310 may access one or more product availability matrices 303. A product availability matrix 303 may provide information about the availability of software applications, versions, or specific features, for upgrade (e.g., as a target system). In some cases, legacy code or data from a current system may not be transferrable to certain upgraded systems; such information may be available in a product availability matrix 303 as well.

The transition effort analyzer 310 may access a custom code analyzer 304. The custom code analyzer 304 may access any custom code in the current system being analyzed for transition. The transition effort analyzer 310 may pass to the custom code analyzer 304 a reference to the custom code for analysis, such as a namespace, or may provide custom code files directly, in addition to identifying or location information for the current system. The custom code analyzer 304 may identify parts of the custom code that require updates, changes, or reprogramming. This may be accomplished in conjunction with change information from the change database 301. The custom code analyzer 304 may provide a list to the transition effort analyzer of all the needed changes identified in the custom code. In some embodiments, the custom code analyzer 304 may be integrated with the transition effort analyzer 310.

The transition effort analyzer 310 may access a software upgrade manager 305. The software upgrade manager 305 may provide upgrade management information, such as an expected or average downtime for upgrades to a given target system or maximum allowed downtime. The software upgrade manager 305 may provide upgrade timelines or schedules, and may receive effort estimates from the transition effort analyzer 310 for use in generating or refining timelines or an upgrade plan. The software upgrade manager 305 may also provide information about additional components that must be included in an upgrade to the target system, such as new features or new custom code requirements that aren't currently available or met in the current or legacy code.

The transition effort analyzer 305 may access a maintenance planner 306. The maintenance planner 306 may provide maintenance information for the current system, such as planned outages or downtime. The maintenance planner 306 may also provide information about needed corrections or fixes to the custom code that can be implemented as part of the transition process.

The transition effort analyzer 310 may include a change classification engine 312. The change classification engine 312 may classify the identified required changes into categories or subcategories, which may be used to determine effort or time estimates, or develop an upgrade or transition plan. The change classification engine 312 may be implemented as a machine-learning algorithm, or may be a machine-learning analytics service accessed remotely by the transition effort analyzer 310.

The transition effort analyzer 310 may include an estimate calculation engine 314. The estimate calculation engine 314 may calculate an estimated time or effort to implement the identified changes to the current system. In some embodiments, this calculation may be in part based on the classification of each identified change. The estimate calculation engine 314 may be implemented as a machine-learning algorithm, or may be a machine-learning analytics service accessed remotely by the transition effort analyzer 310.

The transition effort analyzer 310 may generate one or more results 320. The results 320 may be the transition estimates and recommendations 215 shown in FIG. 2. Generally, the results 320 may include classifications for the needed changes identified, recommendations on how to make the changes, estimates for time and effort (e.g., person-days) to make each of the changes, and totals for the time and effort estimates. Efforts can also be specified in terms of computing resources, such as an amount of processor time, memory use, network use, etc. that may be required for a transition. These results may be categorized as pre-upgrade efforts 321, post-upgrade efforts 325, and downtime 323. These results 320 may be provided directly to a user interface, or in a file, such as a spreadsheet.

The pre-upgrade efforts 321 may include information about how the current system (or source system) may be prepared for the transition. For example, a lock object may be deprecated, then the source code may already be changed, or changeable, using a generic Enqueue/Dequeue. The downtime 323 may include the time needed for some portion of the custom code in the current system (such as in a particular namespace) to be changed, updated, or reprogrammed. For example, a database table such as Table1 may be deprecated and then replaced with a new table such as New1 in the target version. Then, if there was a custom extension field, such as CF1, in Table1, the custom extension field CF1 now needs to be adapted for the new table New1 so that the data can be migrated for this field as well. Thus, the downtime may include the time needed to accomplish this. The post-upgrade efforts 325 may include testing of the system after the transition is complete, such as checking the stability of the system or confirming the correct functioning of the system, or other functional scope of the system. This may also include the configuration or reconfiguration of other support systems or applications. For example, the configuration setup for a launchpad application may need to be run against the final, transitioned system.

The results 320 may include one or more reports 327, such as a spreadsheet. Such a report 327 may include a table having such columns as: code object type, object name, object subtype, current system package, dependency category, change category, change subcategory, proposed solution (or recommended change), time estimate, effort estimate. Some columns may have multiple instances; for example, there may be more than one "change category" if several categories are assigned. There may also be total fields, such as a total time, or total person-days, for the entire report, or for sections of the report. Other columns or tables may be used.

As another example, a report 327 may be as follows:

| Type of Change in Change List (or Category) | Subcategory | Reference Points (or Location) | Proposed Solution (or Recommended Change) | Efforts in Person-Days Without Solution | Effort in Person-Days With Solution | Resource Cost Without Solution | Resource Cost With Solution |
| --- | --- | --- | --- | --- | --- | --- | --- |
| Syntactically incompatible change | Interface Parameter changed | [0-10] in custom codebase | System proposes list of places in the custom code base where the interface parameter was called and then gives the option of changing the code to the new parameter. | 3 PD | 0.5 PD | 3,000 | 1,000 |
| Semantically incompatible change | Data Type Extension of a field in a Table | [0-10] in custom codebase | System proposes list of places in the custom code base where this data type was used, which must be adapted to the new type. (e.g., a data type increased from 3 characters to 5 characters may need to be adapted by appending '00' to the data type) | 10 PD | 1 PD | 15,000 | 5,000 |
| UI Changes | New UI Field added to an existing screen | [10-100] in custom codebase | System proposes list of places in the custom code base where this screen was called. It adds the new field along with the existing fields to be considered for further processing. (e.g., calling programs of the screen need to populate the value in the new field during execution) | 20 PD | 2 PD | | |
| Data Model Changes | Data Container Change | [100-500] in custom codebase | System proposes list of places in the custom code base where this data container was used and customer must re-write APIs to new Data Container | 40 PD | 20 PD | | |

Note that this report provides indications of steps that either are taken during a transition or can be carried out prior to a transition in order to reduce transition cost, either in terms of manual effort or computing resource use (which, in at least in some cases, can use a cost function that can be a combination, such as a weighted combination, or factors such as CPU use, memory use, network use, disk accesses, etc.). Taking the recommended solution can, at least in some aspects, reduce one or both of manual effort and computing resource use. For example, by highlighting potential problem areas to a user (such as in a wizard that scrolls through problem areas and provides a user an option to make a change, including accepting a system suggested change) less manual effort is required to accomplish a transition, which can also reduce resource use (e.g., because a user spends less time opening files, scrolling through code, running tests, etc.).

In a further example, if a user is aware of the source of a problem, the user can either use, or create, tools to automatically correct the problem. For example, when a function call or table format has changed, the user can use or create a program that automatically searches for the call/format and adjusts the call/format to be compliant with the target system. Again, such a procedure can greatly reduce manual effort and resource use, generally increasing programming or transition efficiency and reducing the likelihood or rate of errors or bugs. In further case, a transition process can include tools that automatically detect changes that are required in order to accomplish a transition, such as reformatting table data. However, such processes may be somewhat inefficient. An automated process may have to analyze tables individually, for example, to determine what changes are needed and to carry out the changes. If a mismatch is detected prior to transition initiation, the tables can be reformatted prior to transition, which can be more efficient than adjusting table formatting during transition.

A report as described herein, or other data available from the transition analysis, may further be used to generate a testing plan, structure or develop test cases, or integrate testing with upgrade development.

Example 5—Factor Usage in Transition Analyzer Internal Architecture

Figure 4:
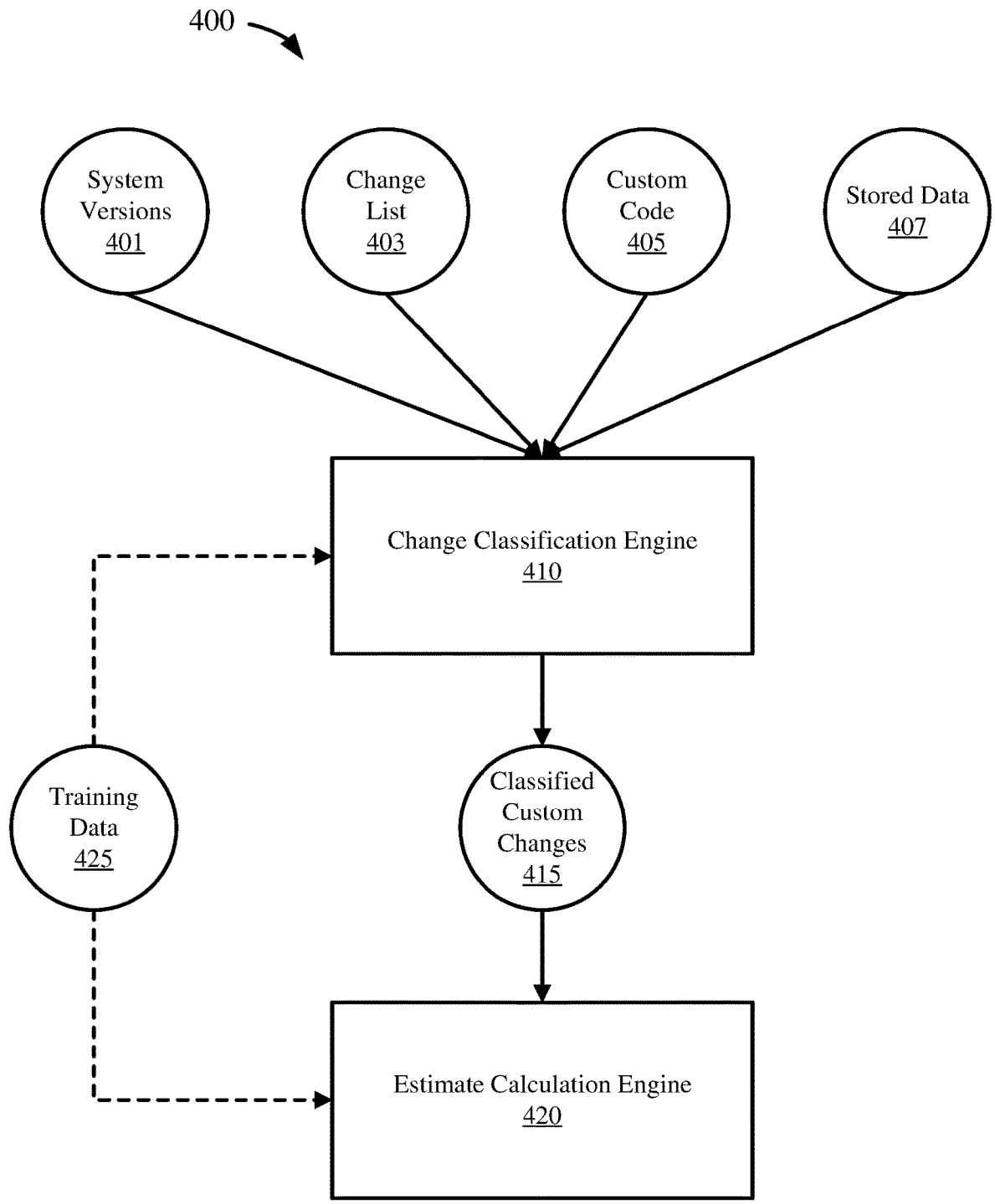
FIG. 4 is a diagram illustrating inputs used within an architecture of a transition effort analyzer.

FIG. 4 is a diagram 400 illustrating inputs used within an architecture of a transition effort analyzer. The transition effort analyzer as described herein may include a change classification engine 410 or an estimate classification engine 420.

The change classification engine 410 may receive as inputs system versions 401, one or more change lists 403, custom code 405, or stored data 407. The system versions 401 may include information, such as the software name or version, of the current system being analyzed for transition or the target system of the transition. The change list 403 may include a list of changes or new features in the target system against which the current system may need to be analyzed for upgrades or compatibility adjustments. The custom code 405 may be custom code from the current system, which may be the actual code or a formatted version of the custom code (such as with metadata included), or may include analysis files from other analytics tools that previously analyzed or scanned the custom code. The stored data 407 may include data, data structure definitions, or database schemas for the current system.

The change classification engine 410 may also receive a list or set of needed changes already identified in the custom code, rather than identifying the needed changes itself. The change classification engine 410 may then classify the identified changes needed to the custom code or stored data to transition the current system to the target system. Generally, the change classification engine 410 may be a machine-learning algorithm. For example, the change classification engine 410 may include the KNN (K-nearest neighbor) machine-learning algorithm. The machine-learning algorithm may be implemented directly in a transition effort analyzer, or may be called from an available service or other program made available, such as from a remote system.

The classified custom changes 415 may be provided to the estimate calculation engine 420 as the input for calculating the time or effort estimates for the changes. The estimate calculation engine 420 may calculate a time or effort (person-days) estimate for each change listed in the classified custom changes 415. The estimate calculation engine 420 may base, in whole or in part, the estimates on the classification information available in the classified custom changes 415. Generally, the estimate calculation engine 420 may be a machine-learning algorithm. For example, the estimate calculation engine 420 may include the Arithmetic Regression machine-learning algorithm. The machine-learning algorithm may be implemented directly in a transition effort analyzer, or may be called from an available service or other program made available, such as from a remote system.

Training data 425 may be provided as input to the change classification engine 410 or the estimate calculation engine 420, or both. The training data 425 may be input data with known or determined outputs. Input training data 425 may include input training changes, which may be a predetermined set of changes for system, where the input training changes are for training the change classification engine 410 or the estimate calculation engine 420, or both. The training data outputs 425 may be classifications or estimates for the input training changes, which can be used to train or improve the machine-learning algorithm in either engine 410, 420. The training data 425 may be real-world data with previously determined or confirmed classifications or estimates, or with assigned or programmatically determined classifications or estimate outputs. So, the input training changes of the training data 425 can represent changes that were manually (or made via another automated method) made previously (e.g. historical data) to reduce effort in transitioning from a current system to a target system.

Additionally or alternatively, the training data 425, such as the input training changes, may be based, at least in part, on a change list for a given system, as described herein. The change list that provides input training changes can represent predefined changes to reduce effort in transitioning from a current system to a target system. In some cases, the changes can be initially be determined manually (or via another automated method), as described above. Note that in some cases a change list may indicate differences between two systems, but does not include information about how to reduce transition effort. In such cases, cases the change list may be used to estimate transition effort, but not to suggest actions to reduce transition effort, or effort reductions that might be achieved by actions to reduce transition effort.

Thus, training changes may include changes from a change list (e.g. release notes), historical changes (e.g. changes recommended or made to other systems when transitioned previously), or recommended changes, such as those determined at step 508 in process 500. Training changes may generally include any change data that may be provided as input to the engines 410, 420.

Thus, the machine-learning algorithms in the engines 410, 420 may process the training data 425 and the outputs generated by the engines may be compared against the training data known outputs, and the algorithms may then be updated or adjusted based on the differences. Generally, the training data 425 may contain a huge number of records for training, but in some cases may contain only a few records (or even one).

Example 6—Transition Analysis Process

Figure 5A:
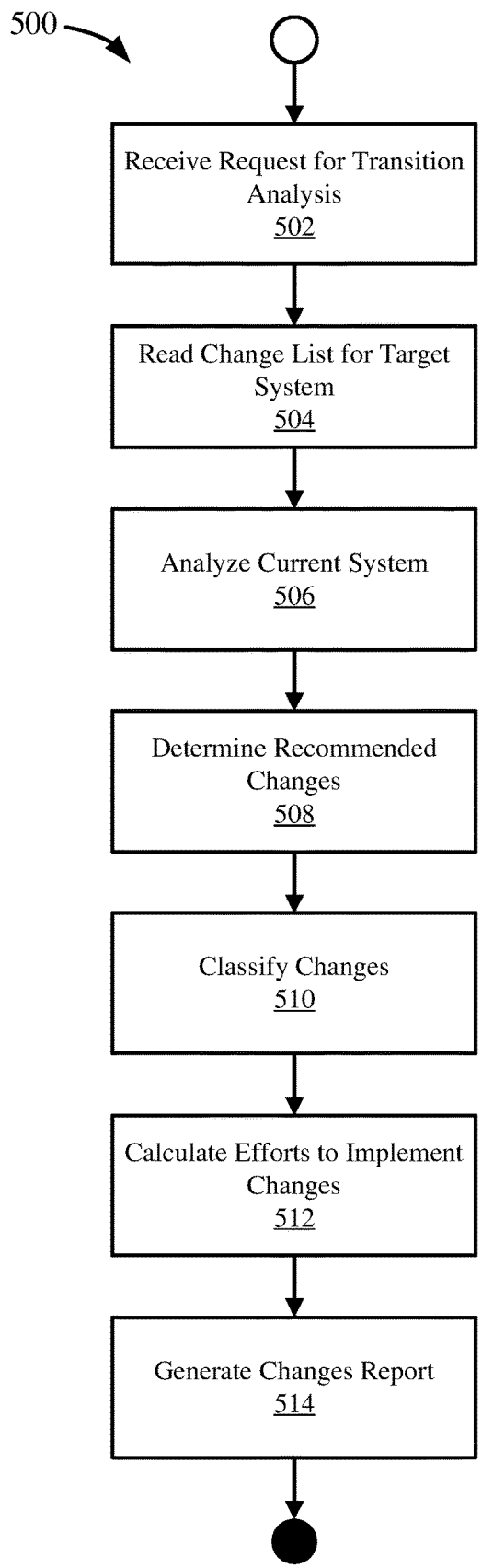
FIG. 5A is a flowchart illustrating a process for transition analysis.

FIG. 5A is a flowchart illustrating a process 500 for transition analysis. A request for transition analysis is received at 502. The request may include identification or version information for a current system or identification or version information for a target system to which to upgrade, convert, or transition the current system. Such information for the current system may include a system location or namespace to use for analysis. Alternatively, the request may be made from within an application toolset that maintains information regarding the current system, or from within the current system itself, such that the information about the current system is readily available to the process 500 without being included in the request. The request may also include other analysis parameters, such as user preferences or limitations on the transition (e.g., maximum allowed downtime or specific priority features in the target system) or identifiers for specific tools, such as code analyzers, to use during the analysis.

The change list for the target system may be read at 504. The change list may be obtained from a change database, a release notes file, or other source, similarly as described herein. Generally, the change list details changes, additions, or updates to the target system compared to a previous version or versions. In some embodiments, multiple change lists may be obtained and read into a single list for scenarios where the target system may be multiple versions from the current system. For example, the current system may be version 1.0, and the target system may be version 2.1, with intervening versions of 1.2, 1.5, and 2.0; in such a scenario, the change lists for each of versions 1.2, 1.5, 2.0, and 2.1 may be read. In other embodiments, the change database may provide the entire list of changes for all versions, and the list is filtered based on the current and target systems. Metadata for the separate changes on the change list may be identified or generated, for use in identifying or categorizing the changes.

The current system is analyzed at 506. This analysis may include identifying the current system, based on the received request, and detecting custom code or stored data that may require updates to be compatible with the target system. This may include obtaining or accessing the custom code or custom data structures.

Recommended changes to custom code or data structures for the current system are determined at 508. The recommended changes may be determined, at least in part, by comparing the custom code of the current system to the change list read at 504. For example, the change list may identify new argument inputs to a given feature or function in the target system; the analysis of the current system at 506 may identify that the given feature is used by the current system, and so the appropriate change to the input is determined and recommended at 508. In another example, a given field in a database or data structure may be changed, such as to have a new type or be split into multiple fields; all points where this field is used may be identified in the custom code or stored data, and the necessary change to the new format or multiple fields may be recommended at 508. This may include identify code segments or functions, or lines of code, that have the particular feature or require the identified change. As explained above, in some cases, the changes can be carried out automatically. Also, in some implementations, a change list can include suggestions for reducing transition effort by changing aspects of the current system before initiating a transition to a target system. In other cases, such suggestions can be provided by a classifier.

The determined recommended changes are then classified at 510. Generally, each determined change is classified separately; however, each change may include multiple locations in the custom code that require updates. The classification may include a category or, additionally, a subcategory. The classification may help refine the recommended change, or may be used, at least in part, to estimate the time or effort necessary to effect the change. The classification categories may be based on the determined recommended changes, the categories of those changes, or on the custom code or stored data directly. The classification categories may, additionally or alternatively, be based on the categories of the changes from the change list at 504, such as determined from the metadata of the change list. Generally, the classification is achieved through use of a machine-learning algorithm. For example, the KNN algorithm may be used to classify the changes; other algorithms may also be used.

Time or effort, or both, are then calculated for the separate classified changes at 512. The time estimate for a change may be the total time estimated to implement the recommended change. The effort estimate for the change may be the total person-days estimated to implement the recommended change. The estimates may be calculated, at least in part, on the classification of the recommended change from step 510, the change list (such as the metadata from the change list) from step 504, or the custom code or stored data itself. Generally, the time or effort estimates may be calculated using a machine-learning algorithm. For example, the arithmetic regression algorithm may be used to calculate the estimates; other algorithms may also be used.

The change report may be generated at 514. This report may include the recommended changes, the classification of the changes, the time estimate for each change, the effort estimate for each change, or the total time or effort estimate for the transition (or any combination thereof). The report may be generated as a spreadsheet, or may be provided through a user interface. The report may also be stored in a file that is re-usable; for example, the generated report may be made available as a pre-check 302 shown in FIG. 3. The report may also include additional results, such as the results 320 shown in FIG. 3 or the estimates and recommendations 215 shown in FIG. 2.

Example 7—Training Machine-Learning Transition Analysis

Figure 5B:
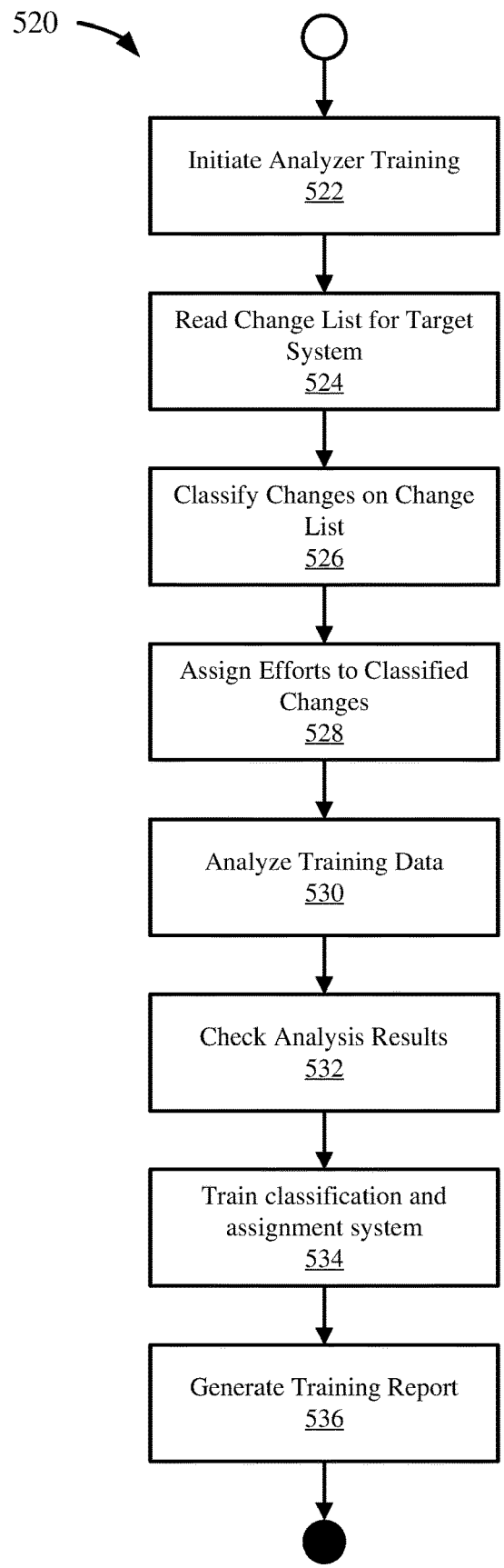
FIG. 5B is a flowchart illustrating a process for training a machine-learning system for transition analysis.

FIG. 5B is a flowchart illustrating a process 520 for training a machine-learning system for transition analysis. Transition effort analyzer training is initiated at 522. The initiation may include changing or setting a mode for the transition effort analyzer to indicate training. The initiation may also include information about training data, such as where to access data needed for training throughout the process 520, or indications as to what data to access, such as file names or locations. Generally, a target system (name or identifier, and version) may be indicated at initiation. Alternatively or additionally, a specific change list may be indicated.

A change list, either specified or applicable to a specified target system, may be read at 524. The change list may be obtained from a change database, a release notes file, or other source, similarly as described herein. Generally, the change list details changes, additions, or updates to the target system compared to a previous version or versions. In some embodiments, multiple change lists may be obtained and read into a single list for scenarios where the target system may be multiple versions from the current system. For example, the current system may be version 1.0, and the target system may be version 2.1, with intervening versions of 1.2, 1.5, and 2.0; in such a scenario, the change lists for each of versions 1.2, 1.5, 2.0, and 2.1 may be read. In other embodiments, the change database may provide the entire list of changes for all versions, and the list is filtered based on the current and target systems. Metadata for the separate changes on the change list may be identified or generated, for use in identifying or categorizing the changes. In some implementations, the change list may include changes to reduce effort in transitioning from a current system to a target system. That is, changes can refer to differences, such as in format, data type, etc., between formats, as well as to changes that can be made to a current system to facilitate transitioning to the new format, data type, etc., of the target system. In other cases, changes to facilitate conversion to the target system are not included in the change list, but are supplied by the classifier.

In some embodiments, the change list at 526 may be training data including a list of changes for a system, also called training data changes, similar to the recommended changes from step 508 as shown in process 500. Thus, the change list used in training (e.g. process 520) may be training data itself, such as from previous analyses of other transitioned systems. In such embodiments, expected classifications and efforts may be attributed to the training data changes at steps 526 and 528 respectively. Thereafter, the training data changes are used to train the machine-learning system through steps 530, 532, ad 534, as described herein.

The changes on the change list may be classified at 526. Generally, each determined change is classified separately. The classification may include a category or, additionally, a subcategory. Such categories or subcategories are generally the same categories or subcategories used for classifying the recommended changes in custom code or training data (e.g. training custom code). The changes on the change list may be classified programmatically, or may be classified based on input from a software developer.

Time or effort estimates may be assigned to the classified changes at 528. The estimates may be assigned based on the classification (category or subcategory) or may be assigned based on the change itself. The estimates may be assigned programmatically, or may be assigned based on input from a software developer.

Training data, such as custom code or stored data used for training, may be analyzed at 530. This analysis may include obtaining or accessing the custom code or custom data structures that are part of the training data. This analysis may include identifying changes needed in the training data based on the change list. This analysis may further include classifying the identified changes, and calculating the time and effort estimates for the changes, generally using the machine-learning algorithms similarly as described in the analysis process 500.

The results of the analysis on the training data are checked at 532. Generally, the results are checked against the classifications and estimates made for the changes on the change list at steps 526 and 528. Checking may include comparing a given output result to the assigned (e.g. expected) result; in some cases, a difference or delta value may be generated based on this comparison.

Based on the check of the results at 532, the transition analyzer is trained at 534. Generally, training is executed when one or more of the results are different from the assigned categories or estimates, or the differences exceed a given threshold. The training generally involves running a process to adjust the machine-learning algorithm based on the difference between the achieved result and the expected result.

A training report may be generated at 536. The training report may include the identified changes to the training data, and the categories or estimates for those changes, similarly as in the analysis process 500. The training report may also include training results, such as any differences detected between the expected results and achieved results, comparison to any applicable threshold, and information about the training process run on the machine-learning algorithms Such a report may be provided in a file, such as a spreadsheet, or in a user interface.

Example 8—Transition Analysis Machine-Learning Lifecycle

Figure 5C:
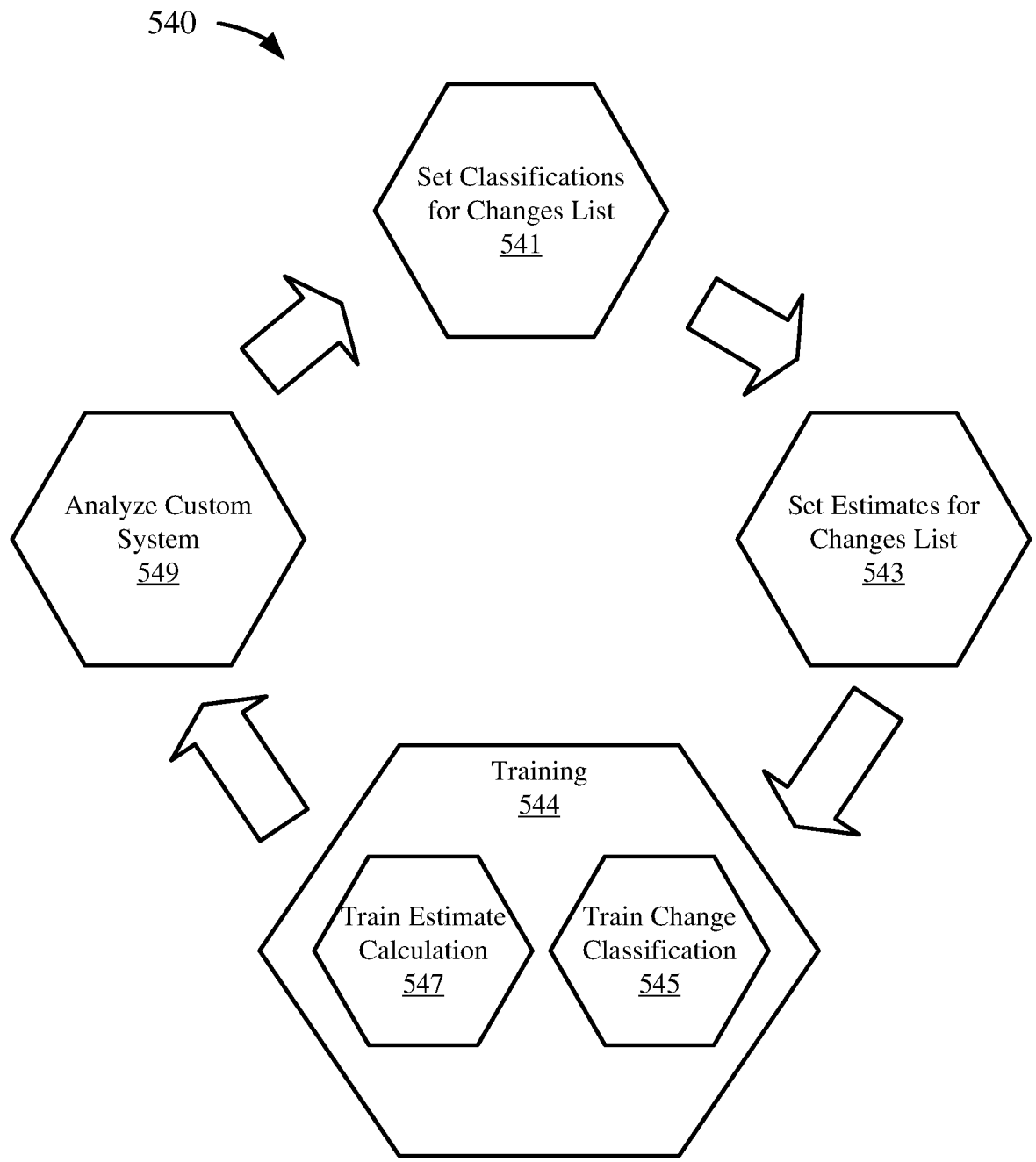
FIG. 5C is a diagram illustrating the lifecycle of transition analysis based on machine-learning.

FIG. 5C is a lifecycle diagram illustrating the lifecycle 540 of transition analysis based on machine-learning. Generally, the lifecycle 540 begins with a new available target system, such as a new software product or version, which may include a change list. Classification of the changes in the change list may be accomplished at stage 541. This may initially be performed by a technical user, administrator, or developer. Later, this may be accomplished using a trained transition analysis analyzer, or results of previous analyses (e.g., pre-checks). The classifications for the changes in the change list may be used to correct and train a machine-learning algorithm. Advantageously, typically, a change list classification only need be carried out a single time. So, for example, a single change list could be used for a variety of different transition options and for a variety of different users, again provided increased efficiency and usability.

Estimates for time to complete a change or effort (e.g. person-days) to complete a change are set at stage 543. This may initially be carried out by a technical user, administrator, or developer. Later, this may be accomplished using a trained transition analysis analyzer, or results of previous analyses (e.g., pre-checks). The estimates may be set based, or based in part, on the classification of the changes. The estimates for the changes in the change list may be used to correct and train a machine-learning algorithm.

Once the training data is completed at stages 541 or 543, the transition analyzer may be trained at stage 544. Training 544 may include training change classifications 545 or training estimate calculations 547. Generally, both change classifications at 545 and estimate calculations at 547 may be carried out as part of training 544, however, in some scenarios only one or the other may be performed. Further, generally change classifications may be trained before estimate calculations, however, in some scenarios, they may be trained independently of each other (e.g., in a different order or in an unrelated manner). Training may generally be accomplished on a test, development, or training system, before the trained algorithms are moved to a production system; in some cases, training may be conducted on a production system (e.g. processing training data through production algorithms or functions). The training may include the process 520 shown in FIG. 5B.

Training data, such as code or stored data, is classified using the machine-learning algorithm being trained at stage 545. This may be a new algorithm not yet trained, or may be one already trained, at least in part, and the training refines the current algorithm. Generally, the change classification training 545 may use the classified change list or lists from stage 541 to accomplish the training. The training at stage 545 may include generating classifications for the training data and comparing the output classifications to the set classifications from stage 541. The differences are then used to train the machine-learning algorithm.

Time or effort estimates are generated for training data, such as classified changes, using the machine-learning algorithm being trained at stage 547. This may be a new algorithm not yet trained, or may be one already trained, at least in part, and the training refines the current algorithm. Generally, the estimate calculation training 547 may use the estimates from stage 543 to accomplish the training. The training at stage 547 may include generating time or effort estimates for the training data and comparing the output estimates to the set estimates from stage 543. The differences are then used to train the machine-learning algorithm.

The trained machine-learning algorithms are then used to analyze a custom system, such as a current system being analyzed for transition to a target system, at stage 549. Generally, analysis of a current system may be accomplished on a production system, to which the trained algorithms, or copies thereof, have been transferred. This analysis at stage 549 may include the process 500 shown in FIG. 5A. The results of the analysis at stage 549 may be available to users for use in deciding to transition or planning a transition to a target system. Results of the analysis at stage 549 may further be used for additional training of the machine-learning algorithms, and so may be used at stage 541 or stage 543, and so on.

Example 9—Transition Analyzer Environments

Figure 6A:
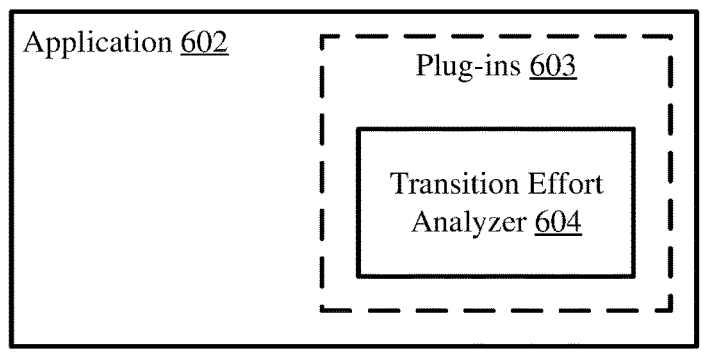
FIG. 6A is a schematic diagram depicting an application environment for a transition effort analyzation framework.

FIG. 6A is a schematic diagram depicting an application environment for a transition effort analyzer 604, which can provide an analyzation framework. An application 602, such as a software application running in a computing environment, may have one or more plug-ins 603 (or add-ins or other software extensions to programs) that add functionality to, or otherwise enhance, the application. The transition effort analyzer 604 may be integrated with the application 602, for example, as a plug-in. The transition effort analyzer 604 may add functionality to the application 602 for automatically detecting and converting files accessed or received by the application. For example, the application 602 may be a launchpad or portal, such as SAP Fiori™ (SAP, SE, Walldorf, Germany), and the transition effort analyzer may be integrated with the launchpad or portal, which provides access to the transition effort analyzer to one or more users of the application.

Figure 6B:
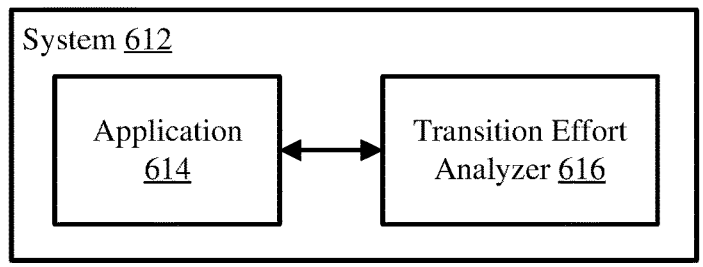
FIG. 6B is a schematic diagram depicting a system environment for a transition effort analyzation framework.

FIG. 6B is a schematic diagram depicting a system environment for a transition effort analyzer 616, which can provide an analyzation framework. The transition effort analyzer 616 may be integrated with a computer system 612. The computer system 612 may include an operating system, or otherwise be a software platform, and the transition effort analyzer 616 may be an application or service running in the operating system or platform, or the transition effort analyzer may be integrated within the operating system or platform as a service or functionality provided through the operating system or platform. The system 612 may be a server or other networked computer or file system. Additionally or alternatively, the transition effort analyzer 616 may communicate with and provide system transition analysis and recommendations, as described herein, to one or more applications, such as application 614, in the system 612.

Figure 6C:
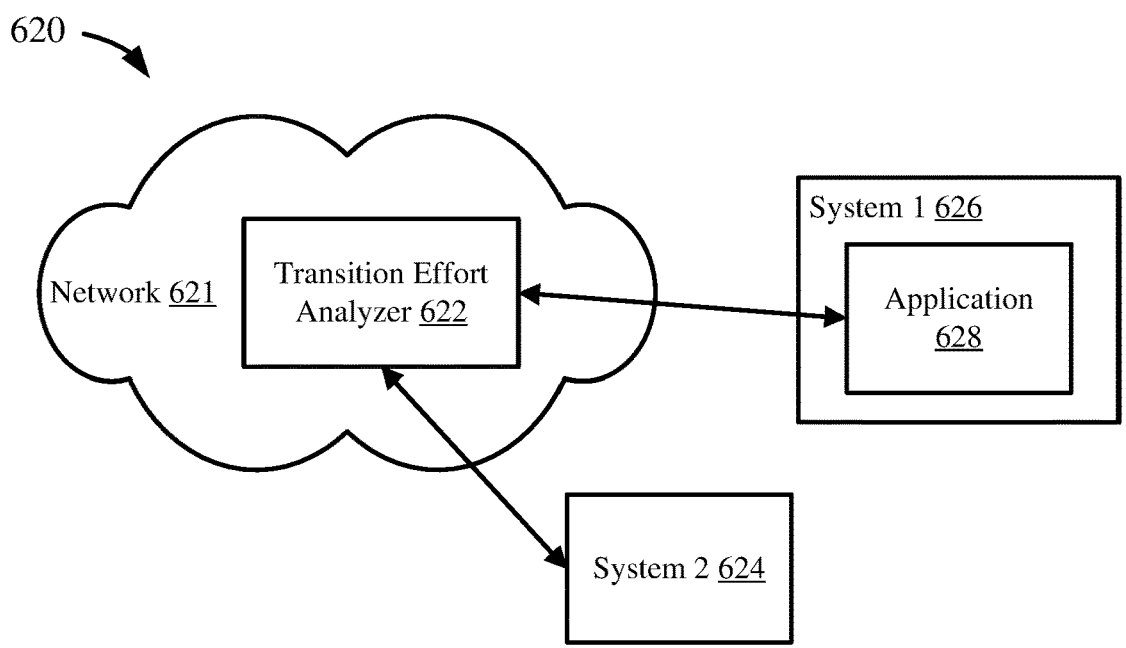
FIG. 6C is a schematic diagram depicting a network environment for a transition effort analyzation framework.

FIG. 6C is a schematic diagram depicting a network environment 620 for a transition effort analyzer 622, which can provide an analyzation framework. The transition effort analyzer 622 may be available on a network 621, or integrated with a system (such as from FIG. 6B) on a network. Such a network 621 may be a cloud network or a local network. The transition effort analyzer 622 may be available as a service to other systems on the network 622 or that have access to the network (e.g., may be on-demand software or SaaS). For example, system 2 624 may be part of, or have access to, the network 621, and so can utilize transition analysis functionality from the transition effort analyzer 622. Additionally, system 1 626, which may be part of, or have access to the network 621, may have one or more applications, such as application 628, that may utilize transition analysis functionality from the transition effort analyzer 622.

In these ways, the transition effort analyzer 604, 616, 622 may be integrated into an application, a system, or a network, to provide transition analysis and recommendation functionality as described herein.

Example 10—Additional Transition Analyzation Processes

Figure 7A:
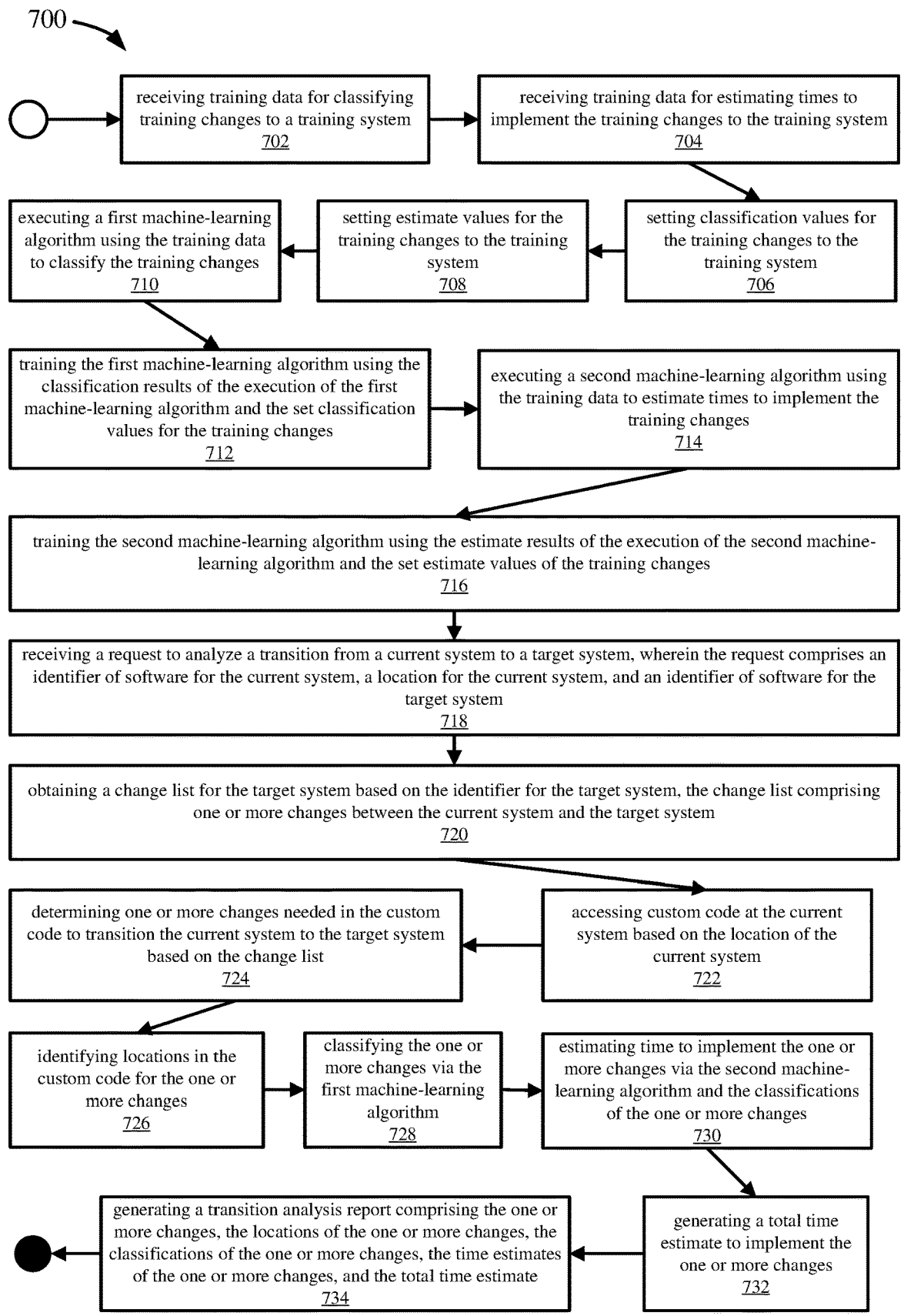
FIG. 7A is a flowchart illustrating a process for training and transition analysis.

FIG. 7A is a flowchart illustrating a process 700 for training and transition analysis. Training data for classifying training changes to a training system may be received at 702. Training data for estimating times to implement the training changes to the training system may be received at 704. Classification values for the training changes to the training system may be set at 706. Estimate values for the training changes to the training system may be set at 708. A first machine-learning algorithm may be executed using the training data to classify the training changes at 710. The first machine-learning algorithm may be trained using the classification results of the execution of the first machine-learning algorithm and the set classification values for the training changes at 712. A second machine-learning algorithm may be executed using the training data to estimate times to implement the training changes at 714. The second machine-learning algorithm may be trained using the estimate results of the execution of the second machine-learning algorithm and the set estimate values of the training changes at 716.

A request to analyze a transition from a current system to a target system may be received at 718. The request may include an identifier of software for the current system, a location for the current system, and an identifier of software for the target system. A change list for the target system may be obtained based on the identifier for the target system at 720. The change list may include one or more changes between the current system and the target system. Custom code may be accessed at the current system based on the location of the current system at 722. One or more changes needed in the custom code to transition the current system to the target system based on the change list may be determined at 724. Locations in the custom code for the one or more changes may be identified at 726. The one or more changes may be classified via the first machine-learning algorithm at 728. Time to implement the one or more changes may be estimated via the second machine-learning algorithm and the classifications of the one or more changes at 730. A total time estimate to implement the one or more changes may be generated at 732. A transition analysis report may be generated at 734. The transition analysis report may include the one or more changes, the locations of the one or more changes, the classifications of the one or more changes, the time estimates of the one or more changes, and the total time estimate.

Figure 7B:
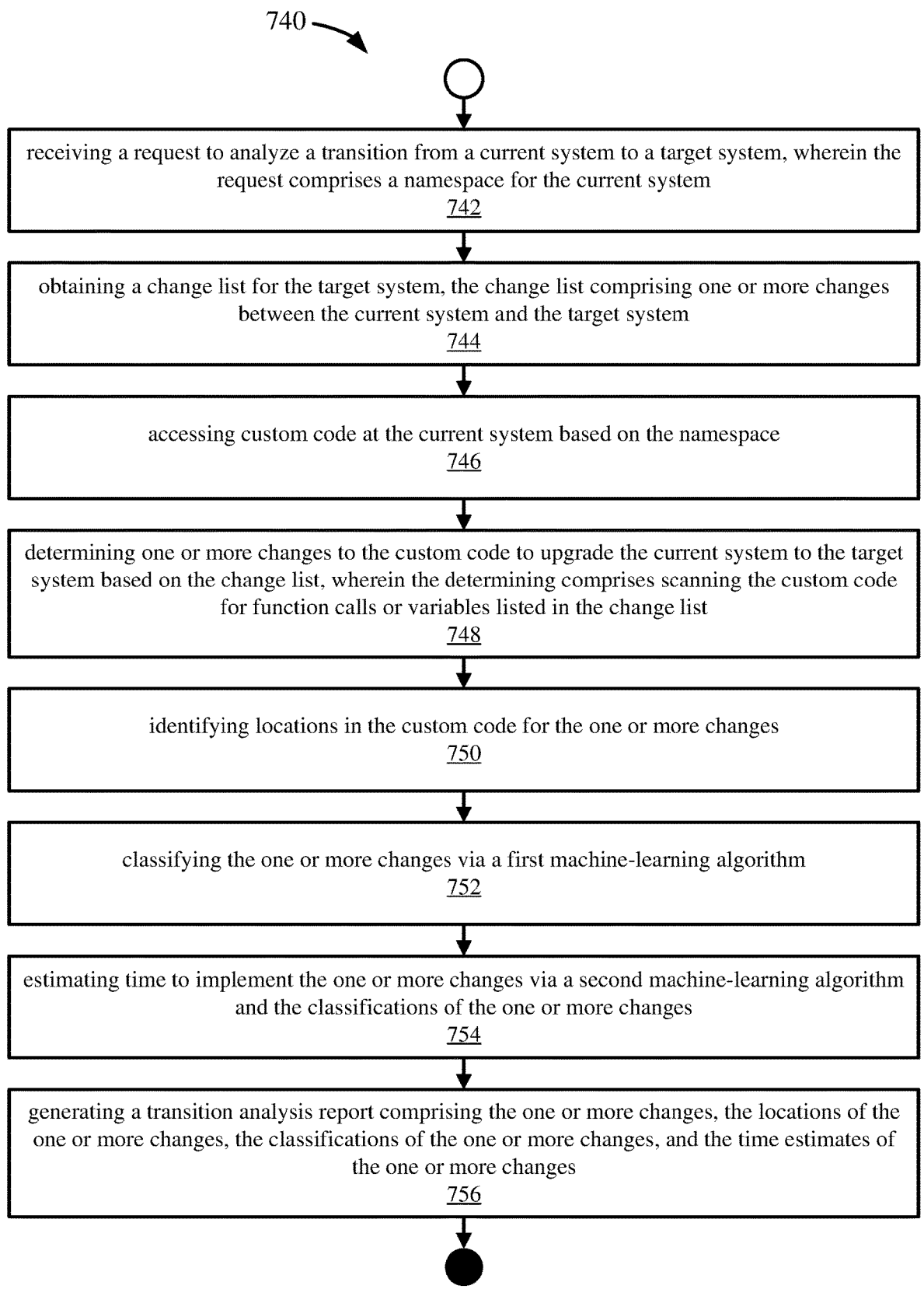
FIG. 7B is a flowchart illustrating a process for system upgrade analysis.

FIG. 7B is a flowchart illustrating a process 740 for system upgrade analysis. A request to analyze a transition from a current system to a target system may be received at 742. The request may include a namespace for the current system. A change list for the target system may be obtained at 744. The change list may include one or more changes between the current system and the target system. Custom code may be accessed at the current system based on the namespace at 746. One or more changes to the custom code to upgrade the current system to the target system based on the change list may be determined at 748. The determining may include scanning the custom code for function calls or variables listed in the change list. Locations in the custom code for the one or more changes may be identified at 750. The one or more changes may be classified via a first machine-learning algorithm at 752. Time to implement the one or more changes may be estimated via a second machine-learning algorithm and the classifications of the one or more changes at 754. A transition analysis report may be generated at 756. The transition analysis report may include the one or more changes, the locations of the one or more changes, the classifications of the one or more changes, and the time estimates of the one or more changes.

Figure 7C:
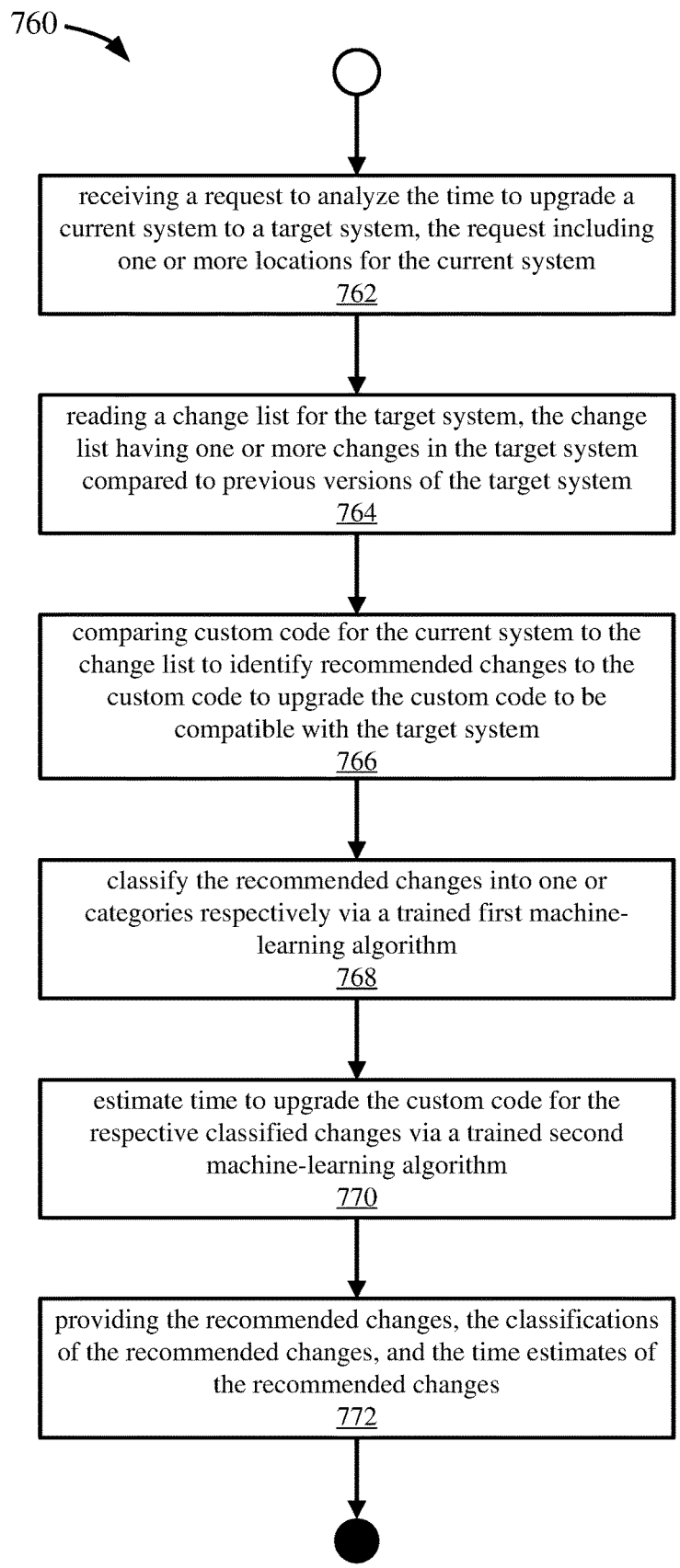
FIG. 7C is a flowchart illustrating a process for machine-learning upgrade analysis.

FIG. 7C is a flowchart illustrating a process 760 for machine-learning upgrade analysis. A request to analyze the time to upgrade a current system to a target system may be received at 762. The request may include one or more locations for the current system. A change list for the target system may be read at 764. The change list may have one or more changes in the target system compared to previous versions of the target system. Custom code for the current system may be compared to the change list to identify recommended changes to the custom code to upgrade the custom code to be compatible with the target system at 766. The recommended changes may be classified into one or more categories respectively via a trained first machine-learning algorithm at 768. Time to upgrade the custom code for the respective classified changes may be estimated via a trained second machine-learning algorithm at 770. The recommended changes, the classifications of the recommended changes, and the time estimates of the recommended changes may be provided at 772.

Example 11—Computing Systems

Figure 8:
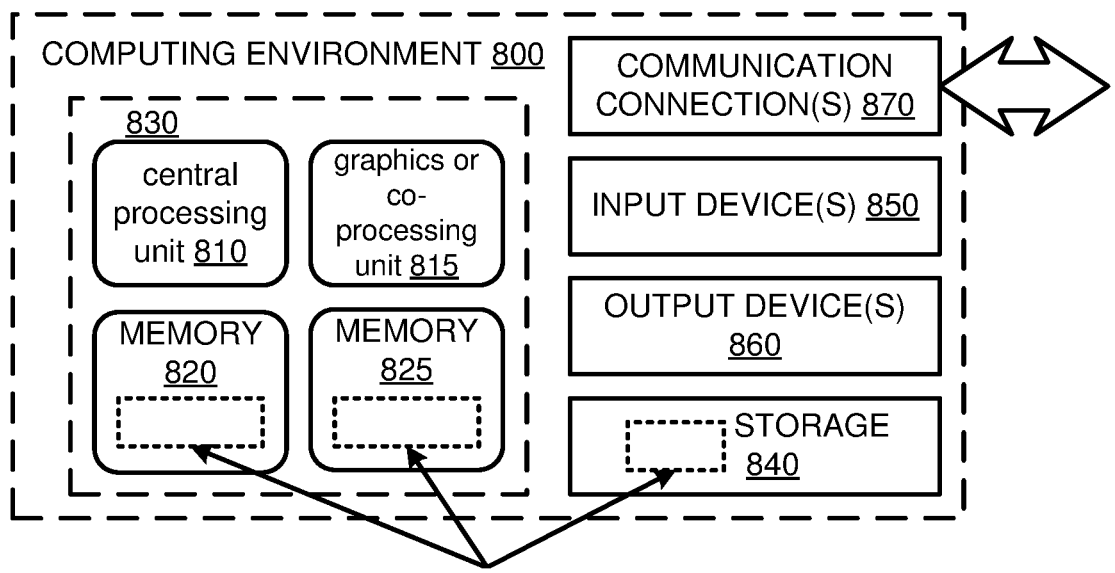
FIG. 8 is a diagram of an example computing system in which described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing components of the processes of FIGS. 5A-C, and 7A-C or the systems of FIGS. 1-4, and 6A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 890 implementing one or more innovations described herein, in the form of computer-executable instructions suitable for execution by the processing unit(s) 810, 815. The memory 820, 825, may also store settings or settings characteristics, such as for the factors in FIGS. 2 and 4, systems in FIGS. 1, 3, and 6A-C, or the steps of the processes shown in FIGS. 5A-C and 7A-C.

A computing system 800 may have additional features. For example, the computing system 800 includes storage 840, one or more input devices 850, one or more output devices 860, and one or more communication connections 880. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 890 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 880 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 9:
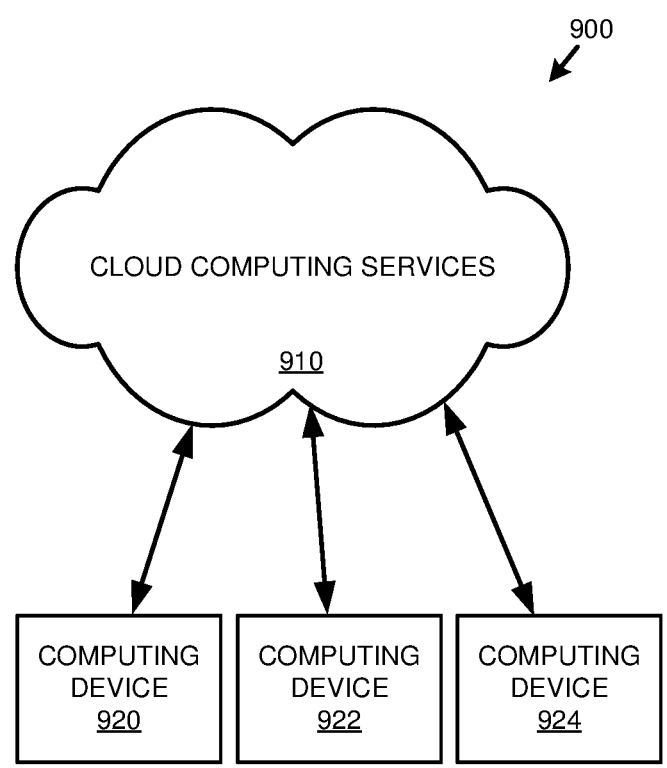
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 820 and 825, and storage 840. The term computer-readable storage media does not include signals and carrier waves. In addition, the term computer-readable storage media does not include communication connections (e.g., 880).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
    one or more memories;
    one or more processing units coupled to the one or more memories; and
    one or more computer readable storage media storing instructions that, when executed, cause the computing system to perform operations comprising:
        receiving training data, the training data comprising a first set of a first plurality of code change types in transitioning computing systems between computing system states and a set of actions that can be taken to, for respective code change types of the first plurality of code change types, reduce an effort in transitioning a computing system from a respective first state of a computing system to a respective second state of the computing system, wherein the first plurality of code change types comprises code change types for changes to custom code;
        training a first machine-learning algorithm using at least a portion of the training data to provide a trained classifier;
        receiving a request to analyze a transition of custom code in a first computing system from a first state of the first computing system to a second state of the first computing system, the request comprising one or more code change instances of one or more code change types of the plurality of change types;
        submitting at least a first portion of the one or more code change instances to the trained classifier; and
        receiving, from the trained classifier, for respective code change instances of at least a second portion of the first portion of the one or more code change instances, one or more actions of the set of actions that will reduce a transition effort associated with the respective code change instance in transitioning the first computing system between the first state and the second state, wherein the one or more actions of the set of actions comprise reducing a number of computing operations needed to complete the transition to reduce the transition effort.

2. The computing system of claim 1, the operations further comprising:
    generating a total time estimate to implement the one or more change instances in transitioning the first computing system between the first state and the second state,
    generating a transition analysis report containing the total time estimate to implement the one or more change instances in transitioning the first computing system between the first state and the second state, and
    providing the transition analysis report via a transition wizard in a user interface.

3. One or more non-transitory computer-readable storage media comprising:
    computer-executable instructions that, when executed by a computing system comprising at least one hardware processor and at least one memory coupled to the at least one hardware processor, cause the computing system to receive training data, the training data comprising a first set of a first plurality of code change types in transitioning computing systems between computing system states and a set of actions that can be taken to, for respective code change types of the first plurality of code change types, reduce an effort in transitioning a computing system from a respective first state of a computing system to a respective second state of the computing system;
    computer-executable instructions that, when executed by the computing system, cause the computing system to train a first machine-learning algorithm using at least a portion of the training data to provide a trained classifier;
    computer-executable instructions that, when executed by the computing system, cause the computing system to receive a request to analyze a transition of code in a first computing system from a first state of the first computing system to a second state of the first computing system, the request comprising one or more code change instances of one or more code change types of the plurality of change types;
    computer-executable instructions that, when executed by the computing system, cause the computing system to submit at least a first portion of the one or more code change instances to the trained classifier; and
    computer-executable instructions that, when executed by the computing system, cause the computing system to receive, from the trained classifier, for respective code change instances of at least a second portion of the first portion of the one or more code change instances, one or more actions of the set of actions that will reduce a transition effort associated with the respective code change instance in transitioning the first computing system between the first state and the second state, wherein the one or more actions of the set of actions comprise reducing a number of computing operations needed to complete the transition to reduce the transition effort.

4. The one or more non-transitory computer-readable storage media of claim 3, further comprising:
    computer-executable instructions that, when executed by the computing system, cause the computing system to estimate a resource usage for transitioning the computing system from the respective first state of the computing system to the respective second state of the computing system.

5. The one or more non-transitory computer-readable storage media of claim 3, further comprising:
    computer-executable instructions that, when executed by the computing system, cause the computing system to calculate an estimated downtime to transition the computing system from the respective first state of the computing system to the respective second state of the computing system.

6. The one or more non-transitory computer-readable storage media of claim 3, further comprising:
    computer-executable instructions that, when executed by the computing system, cause the computing system to generate a total time estimate to implement the one or more change instances in transitioning the first computing system between the first state and the second state, computer-executable instructions that, when executed by the computing system, cause the computing system to generate a transition analysis report containing the total time estimate to implement the one or more change instances in transitioning the first computing system between the first state and the second state, and computer-executable instructions that, when executed by the computing system, cause the computing system to provide the transition analysis report via a transition wizard in a user interface.

7. A method, implemented by a computing system comprising at least one hardware processor and at least one memory coupled to the at least one hardware processor, the method comprising:

receiving training data, the training data comprising a first set of a first plurality of code change types in transitioning computing systems between computing system states and a set of actions that can be taken to, for respective code change types of the first plurality of code change types, reduce an effort in transitioning a computing system from a respective first state of a computing system to a respective second state of the computing system;

training a first machine-learning algorithm using at least a portion of the training data to provide a trained classifier;

receiving a request to analyze a transition of code in a first computing system from a first state of the first computing system to a second state of the first computing system, the request comprising one or more code change instances of one or more code change types of the plurality of change types;

submitting at least a first portion of the one or more code change instances to the trained classifier; and receiving, from the trained classifier, for respective code change instances of at least a second portion of the first portion of the one or more code change instances, one or more actions of the set of actions that will reduce a transition effort associated with the respective code change instance in transitioning the first computing system between the first state and the second state wherein the one or more actions of the set of actions comprise ordering the at least a second portion of the first portion of the one or more code change instances to reduce the transition effort.

8. The method of claim 7, the method further comprising:
estimating a resource usage to transition the computing system from the respective first state of the computing system to the respective second state of the computing system.

9. The method of claim 7, the method further comprising:
calculating an estimated downtime to transition the computing system from the respective first state of the computing system to the respective second state of the computing system.

10. The computing system of claim 1, the operations further comprising:

generating a total time estimate to implement the one or more change instances in transitioning the first computing system between the first state and the second state, and generating a transition analysis report containing the total time estimate to implement the one or more change instances in transitioning the first computing system between the first state and the second state.

11. The computing system of claim 1, wherein the custom code is code that is addition to, and different from, standard code for the computing system.

12. The computing system of claim 1, wherein the custom code is transitioned independently from standard code in the computing system and the custom code is code that is addition to, and different from, standard code for the computing system.

13. The one or more non-transitory computer-readable storage media of claim 3, wherein the first plurality of code change types comprises code change types for changes to custom code.

14. The one or more non-transitory computer-readable storage media of claim 13, wherein the custom code is code that is addition to and different from standard code for the computing system and is transitioned independently from standard code in the computing system.

15. The one or more non-transitory computer-readable storage media of claim 13, wherein the custom code is code that is addition to, and different from, standard code for the computing system.

16. The method of claim 7, wherein the first plurality of code change types comprises code change types for changes to custom code.

17. The method of claim 16, wherein the custom code is code that is addition to and different from standard code for the computing system and is transitioned independently from standard code in the computing system.

18. The method of claim 16, wherein the custom code is code that is addition to and different from standard code for the computing system.

19. The computing system of claim 1, wherein the reducing a number of computing operations comprises ordering the at least a second portion of the first portion of the one or more code change instances.

20. The computing system of claim 1, wherein the reducing a number of computing operations comprises prioritizing the at least a second portion of the first portion of the one or more code change instances.

* * * * *